Patented Apr. 1, 1924.

1,488,914

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

METHOD OF MAKING SHEET GLASS.

No Drawing. Application filed December 1, 1920. Serial No. 427,565.

*To all whom it may concern:*

Be it known that I, FREDERICK GELSTHARP, a citizen of Great Britain, residing at Tarentum, in the county of Allegheny and State of Pennsylvania, have invented certain new and useful Improvements in Methods of Making Sheet Glass, of which the following is a specification.

The invention relates to the manufacture of sheet glass, such as plate glass, window glass and spectacle glass, and has for its principal object, the production of a glass which shall be freer from seed than that heretofore produced and which shall be clearer and better adapted for use in spectacle lenses and other relations where a very clear transparent glass is desired, and in the manufacture of which the proportion of first quality glass produced shall be greater than in the processes heretofore employed. The invention relates in a large degree to the means employed for "fining" the glass, the basic batch being preferably similar to that commonly employed heretofore as will later appear.

In carrying out the invention, I have employed the batch set forth below, which batch will serve to illustrate the principles of the invention although the proportions and constituents may be widely varied as explained more fully later. The formula is as follows:

| | Parts. |
|---|---|
| Sand ($SiO_2$) | 1000 |
| Soda ash (sodium carbonate $Na_2CO_3$) | 298 |
| Salt cake (sodium sulphate) | 5 |
| Sodium chlorid (NaCl) | 25 |
| Limestone (calcium carbonate $CaCO_3$) | 309 |
| Arsenic (arsenious oxid $As_2O_3$) | 15 |
| Sodium nitrate ($NaNO_3$) | 30 |

The foregoing formula is basically similar to many heretofore employed, one of which, for the purpose of comparison, being the same as that above set forth except that the amount of salt cake in such old formula was 60 parts, the amount of arsenic 5 parts, sodium nitrate was lacking, and 3 parts of charcoal or coal was used. The primary distinctions between the two formulas or batches relates to the ingredients for securing the final ebullition or boiling necessary to fine the glass, such result being accomplished in the old process by the action of the salt cake and the charcoal or coal and arsenic, while in the new process it is primarily accomplished by the arsenic after such arsenic has reacted with the sodium nitrate and taken oxygen therefrom. Following is an approximate statement of the old formula in tabular form.

| | Parts. |
|---|---|
| Sand | 1000 |
| Soda ash | 298 |
| Salt cake | 60 |
| Sodium chloride | 25 |
| Limestone | 309 |
| Arsenic | 5 |
| Charcoal | 3 |

With the old process the boiling or ebullition for fining glass was produced by the decomposition of the salt cake, which action was made effective by the action of the charcoal or coal and the reducing flame of the furnace which acted to change a part of the salt cake into a sulphide, arsenate and sulpharsenate being also formed, these compounds together then reacted with some of the remaining undecomposed salt cake producing a boiling effect in the molten glass when its temperature has reached the fining stage. This boiling action in the concluding portion of the operation serves to clear the glass of a large portion of the bubbles held in the glass, such action being known in the art as "fining the glass". This operation, however, while producing the general effect desired, still resulted in a finished glass containing an undue amount of very fine bubbles or seed rendering a great proportion of the glass unfit for silvering purposes. This seed, as produced in the old process, was due more or less, I believe, to what may be termed a deferred decomposition of a small portion of the salt cake which was not decomposed during the main fining operation, such decomposing continuing on a small scale until the conclusion of the heating operation and leaving fine bubbles or seed in the glass as a result. An analysis of the glass made by this old process shows that a small amount of salt cake, about .7 to 1 per cent, always remains in the glass.

It has been the purpose of my improvement to modify the fining operation so that the salt cake, or its equivalent, may be entirely omitted as a fining agent or so reduced in quantity that the minute quantity left in the glass does not act to produce seed after the fining operation, as above set forth in connection with the old process, the salt cake almost disappearing from the finished glass, and the relatively small amount which is employed, being used for a purpose entirely apart from the fining, as hereinafter set forth.

In order to get a glass sufficiently strong or resistant to be used for sheet glass, such as plate, window or optical glass, it is desirable that a relatively high proportion of lime (CaO) as compared to soda ($Na_2O$) should be used in the batch or melt. This proportion of lime to soda must not be less than 1 to 2 by weight, and it is found advantageous to have the proportions approximate 1 to 1 by weight, those being substantially the proportions given in the two formulas heretofore specified, wherein soda in the 298 parts of soda ash is substantially equal by weight to the lime in the 309 parts of limestone. In such a glass, that is with the proportion of lime to soda 1 to 2 or greater, a scum is formed on the surface of the metal which is very difficult to get rid of and which comprises a high silicate of calcium and sodium. I have found that this scum may be gotten rid of in my process by the use of a small proportion of salt cake, such salt cake acting in a manner not completely understood, but probably as a catalytic agent causing the scum to entirely disappear.

The salt cake in my process is therefore used as an agent for eliminating the scum characteristic of lime glass, and not as a fining agent as in the old process, the percentage of salt cake used being entirely too small to accomplish this result and not being used with charcoal or other reducing carbon such as is necessary in order to make the salt cake effective as a fining agent. Glass having a relatively high percentage of lime as above set forth, for the purpose of giving the necessary strength, may for convenience of reference and definition, be referred to as "lime glass", and such term is used to distinguish from glasses having a lime content as compared to soda of less than 1 to 2, such glasses of low lime content being unsuitable for sheet glass and not requiring the salt cake since there is no formation of the objectionable scum in such glasses.

The primary boiling or fining action with my preferred process is secured from the sodium nitrate with the arsenic, and by arsenic is meant the white arsenic or arsenious oxid of commerce. Such sodium nitrate supplies oxygen to the arsenic to change it from the lower oxid $As_2O_3$, to the higher oxid (arsenic oxid $As_2O_5$), in which form it unites with some of the soda and calcium in the batch, forming sodium arsenate and calcium arsenate and remains for a longer time in the metal. That is, the higher oxid, combined with the soda and calcium, is in a more stable form which resists decomposition until the time is reached when the fining or boiling operation is effective to finally clear the glass. Without the sodium nitrate or some other oxidizing agent, the arsenic has a tendency to vaporize and be lost before the final fining operation in which its action is most beneficial.

The boiling or fining action is therefore accomplished in my process independently of the salt cake, and such salt cake almost disappears from the finished glass which gives an analysis showing sulphur corresponding to only .07% or less of sulphate as opposed to sulphur corresponding to .7% or more of salt cake found in all glass produced by the salt cake fining operation. In other words, only about one-tenth as much sulphate is left in the glass formed by my process (when such process is practiced in its best form) as is the case in ordinary sheet glass formed by the recognized and universally used salt cake method. I find that my process produces a much greater amount of silvering glass than the salt cake method, and of a better color and clearer, due to the absence of the charcoal and sulphur, which is of special importance when the glass is to be used for optical glass, one of the large uses of the glass being for spectacles. In the making of the spectacle blanks the ordinary practice is to cast the glass in sheets like plate glass, which are then cut up into blanks, usually after the plates are ground and polished. The operation of my process is also cheaper since the corrosive effect of the salt cake on the pots is largely done away with and there is a saving due to the lower fusing point of the batch, less fuel being required and the deterioration in the pots and furnaces incident to the heat being less. These matters as to cost of operation are, however, of small importance as compared to the advantage incident to the superior quality of glass produced.

The preferred process as above outlined might be readily modified to produce substantially the same results by substituting an additional quantity of sodium nitrate to entirely or partially take the place of the soda ash. The amount of sodium nitrate added would correspond to the amount of soda required incident to the reduction in the amount of soda ash or its entire substitution. This modification is not preferred because the sodium nitrate is more expensive than the soda ash, but the results aside from the matter of cost would be substantially the same. The amount of nitrate might, if desired, be considerably reduced below the amount stated in the tabular formula.

It will also be understood that the formula as above given is merely illustrative of the basic portion of the batch. Silica, soda, and lime are, of course, necessary as basic elements but might be gotten into the melt in various forms aside from the sand, soda ash, and limestone. For instance, silica might be provided by some of the feldspars and other silicate minerals, as also a part or all of the soda, and slaked lime or other calcium compounds or mineral silicates used instead of the limestone.

Some substitute may be used for the arsenic, such as antimony, which the oxygen of the sodium nitrate would react with to produce a compound more resistant to decomposition and so available in the late fining stage. My invention contemplates such substitutes as have the action of arsenic as a fining agent when used in a glass batch with a nitrate or other oxidizing agent, to supply oxygen, but I know of no generic term applicable to such substances, and will therefore, refer to them in my definition of the invention in the claims as compounds having the reactions in glass characteristic of arsenic when used with an oxidizing agent, such definition, by my intent, comprehending arsenic itself as well as the substitutes, such as antimony.

Some other nitrate might also be used as a partial or entire substitute for the sodium nitrate, as other nitrates such as potassium nitrate would supply the oxygen necessary to react with the arsenic, and my invention comprehends such other nitrates, although the sodium nitrate is preferable because of its cheapness and the superior quality of glass produced. It is also feasible to use oxidizing agents other than nitrates, such as sodium or barium peroxide or ammonium or potassium persulphate, or chlorate.

I have referred to the preferred use of a small amount of salt cake, but this is not absolutely necessary as the sulphate might be supplied in other ways, as for instance, an impurity in the soda ash or other constituent of the batch, or by using some other sulphur compound such as calcium sulphate or potassium sulphate. Where other sulphates aside from the salt cake are used, however, the ultimate result is the same in that such sulphates are changed into salt cake (sodium sulphate) during the reaction of the molten glass, and serve to eliminate the objectionable scum heretofore referred to. The term "relatively small amount of sulphate" as used in the claims is intended to cover an amount only sufficient to eliminate the scum, which amount will range from 5 to 10 parts in the formula heretofore given. Less than 5 pounds will ordinarily not cause the elimination of all the scum, and above 10 pounds the sulphate produces a deleterious effect.

Since the primary function of the nitrate or other oxidizing agent in my process is to oxidize the low arsenic oxid, $As_2O_3$, and change it to a higher oxid available as a fining agent in the later stages of the melt, it follows that the same general result might be secured by applying the higher oxid to the batch without the oxidizing agent. For instance, arsenic oxid, $As_2O_5$, might be added to the mix instead of the "white arsenic" $As_2O_3$, and no oxidizing agent would then be required, or compounds containing the higher oxids might be used, such as sodium arsenate or calcium arsenate. The use of the lower oxid with the oxidizing agent is preferred, however, since the reaction in which the lower oxid is changed to a higher one is beneficial in the glass and the lower oxids are cheaper and more available. The effect of the oxidizing agent which reacts with the oxid is also desirable in disposing of impurities and adding clearness to the glass.

In either case, however, the essential step is the same, viz, the use in the fining operation of an oxid, which reacts in the glass in the manner characteristic of the higher oxid of arsenic, such term including either arsenic oxid $As_2O_5$ or the higher antimony oxid $Sb_2O_5$ or other equivalent higher oxid. In the one case, the higher oxid is produced in the glass by the reaction between the lower oxid and the oxidizing agent, while in the other case it is produced before it is added to the glass batch, and in both cases the higher oxid combines with the sodium and calcium in the glass forming sodium arsenate and calcium arsenate, which are very stable and resistant compounds, reacting at a late point in the melting operation to secure the boiling and consequent fining action.

I am aware that sodium nitrate had been used before in the manufacture of glass as well as arsenic, but in so far as I am aware they have never been used in the manufacture of a lime glass having the strength necessary in plate and other sheet glasses as a substitute for salt cake, and in so far as I am aware they have never been used for fining purposes with a percentage of salt cake so small that the sulphur almost disappears in the finished glass, since plate glass as heretofore made contained a quantity of sodium sulphate many times that in my glass and contained seed in quantities greatly in excess of the seed produced in glass made in accordance with my process.

What I claim is:

1. The process of making sheet glass which consists in fining a lime glass melt by the use of arsenic oxid.

2. The process of making sheet glass, which consists in fining a lime glass melt by the use of an oxid having the deferred fining reaction in glass characteristic of arsenic oxid.

3. The process of making sheet glass, which consists in fining a glass melt having a ratio of lime to soda greater than 1 to 2, by the use of an oxid having the deferred fining reaction in glass characteristic of arsenic oxid.

4. The process of making sheet glass which consists in fining a lime glass melt containing a relatively small amount of sulphate, by the use of arsenic oxid.

5. The process of making sheet glass, which consists in fining a lime glass melt containing a relatively small amount of sulphate, by the use of an oxid having the deferred fining reaction in glass characteristic of arsenic oxid.

6. The process of making sheet glass, which consists in fining a lime glass melt containing a relatively small amount of sulphate without a carbon reducing agent, by the use of an oxid having the deferred fining reaction in glass characteristic of arsenic oxid.

7. The process of making sheet glass, which consists in fining a lime glass melt containing a relatively small amount of sulphate without a carbon reducing agent, by the use of an oxid having the deferred fining reaction in glass characteristic of arsenic oxid, the amount of sulphate being limited to a quantity sufficient to cause the elimination of the silicate of calcium and sodium scum characteristic of lime glass.

8. The process of making sheet glass which consists in fining a lime glass melt containing a relatively small amount of sulphate, by the use of an oxid having the deferred fining reaction in glass characteristic of arsenic oxid, the amount of sulphate being so limited that substantially no sulphate remains in the finished glass.

9. The process of making sheet glass, which consists in fining a lime glass melt by the use of an oxidizing agent and a compound having the fining reaction, in molten glass containing an oxidizing agent, characteristic of arsenious oxid and to which the oxidizing agent supplies oxygen.

10. The process of making sheet glass, which consists in fining a lime glass melt by the use of a nitrate and arsenious oxid.

11. The process of making sheet glass, which consists in fining a glass melt having a ratio of soda to lime of less than 2 to 1 by weight by the use of an oxidizing agent and a compound having the fining reaction, in molten glass containing an oxidizing agent, characteristic of arsenious oxid and to which the oxidizing agent supplies oxygen.

12. The process of making sheet glass, which consists in fining a glass melt having a ratio of soda to lime of approximately 1 to 1 by weight by the use of an oxidizing agent and a compound having the fining reaction, in molten glass containing an oxidizing agent, characteristic of arsenious oxid and to which the oxidizing agent supplies oxygen.

13. The process of making sheet glass which consists in fining a lime glass melt containing a relatively small amount of sulphate by the use of an oxdizing agent and a compound having the fining reaction, in molten glass containing an oxdizing agent, characteristic of arsenious oxid and to which the oxidizing agent supplies oxygen.

14. The process of making sheet glass which consists in fining a lime glass melt containing a relatively small amount of sulphate by the use of a nitrate and arsenious oxid.

15. The process of making sheet glass which consists in fining a lime glass melt containing a relatively small amount of sulphate by the use of a nitrate and a compound having the fining reaction, in molten glass containing a nitrate, characteristic of arsenious and to which the nitrate supplies oxygen.

16. The process of making sheet glass which consists in fining a lime glass melt containing a relatively small amount of sulphate by the use of a nitrate and a compound having the fining reaction, in molten glass containing a nitrate, characteristic of arsenious oxid, the amount of sulphate being limited to a quantity sufficient to cause the elimination of the silicate of calcium and sodium scum characteristic of lime glass.

17. The process of making sheet glass which consists in fining a lime glass melt containing a relatively small amount of sulphate by the use of an oxidizing agent and a compound having the fining reaction, in molten glass containing an oxidizing agent, characteristic of arsenious oxid, the amount of sulphate being so limited that substantially no sulphate remains in the finished glass.

18. The process of making sheet glass which consists in fining a glass having a ratio of soda to lime of less than 2 to 1 by weight and containing a relatively small amount of sulphate by the use of an oxidizing agent and a compound having the fining reaction, in molten glass containing an oxidizing agent, characteristic of arsenious oxid, the amount of sulphate being limited to a quantity sufficient to cause the elimination of the silicate of calcium and sodium scum characteristic of lime glass.

19. The process of making sheet glass which consists in fining a glass having a ratio of soda to lime of approximately 1 to 1 by weight, and containing a relatively small amount of sulphate by the use of a nitrate and a compound having the fining reaction, in molten glass containing a nitrate, characteristic of arsenious oxid, the amount of sulphate being so limited that substantially no sulphate remains in the finished glass.

20. The process of making sheet glass which consists in fining a lime glass containing a relatively small amount of sulphate but without a carbon reducing agent for the sulphate, by the use of an oxidizing agent and arsenious oxid.

21. The process of making sheet glass which consists in fusing together a basic batch having a ratio of lime to soda by weight of more than 1 to 2 and containing a relatively small amount of sulphate with an oxidizing agent and a compound having the reaction in molten glass, containing an oxidizing agent, characteristic of arsenious oxid.

22. A clear colorless sheet glass substantially free from sulphate and formed by fining a lime glass melt with a compound having the delayed fining action of arsenic oxid.

In testimony whereof, I have hereunto subscribed my name this 29th day of November, 1920.

FREDERICK GELSTHARP.

Witness:
H. E. RUTHERFORD.